United States Patent [19]

Saitoh et al.

[11] Patent Number: 5,576,101
[45] Date of Patent: Nov. 19, 1996

[54] GAS BARRIER RUBBER LAMINATE FOR MINIMIZING REFRIGERANT LEAKAGE

[75] Inventors: Shinji Saitoh; Masato Yoshikawa, both of Kodaira, Japan

[73] Assignee: Bridgestone Corporation, Tokyo, Japan

[21] Appl. No.: 420,794

[22] Filed: Apr. 12, 1995

Related U.S. Application Data

[63] Continuation of Ser. No. 168,139, Dec. 17, 1993, abandoned.

[30] Foreign Application Priority Data

Dec. 18, 1992 [JP] Japan ............................ 4-355712

[51] Int. Cl.$^6$ .......................... B32B 27/34; B32B 27/32
[52] U.S. Cl. ...................... 428/332; 428/36.91; 428/337; 428/448; 428/451; 428/474.4; 428/475.8; 428/476.1; 428/476.3; 428/476.9; 428/492; 428/521
[58] Field of Search ................... 428/36.91, 448, 428/451, 474.4, 475.8, 476.3, 492, 521, 476.1, 476.9, 332, 337

[56] References Cited

U.S. PATENT DOCUMENTS 5,077,135  12/1991  Wyman .................................. 428/447
5,212,017   5/1993  Meder .................................... 428/447

*Primary Examiner*—D. S. Nakarani
*Attorney, Agent, or Firm*—Sughrue, Mion, Zinn, Macpeak & Seas

[57] ABSTRACT

A gas barrier rubber laminate comprising a nylon film layer, an intermediate layer of a cured trialkoxysilane, and a rubber layer is fully flexible and pliable and has improved gas barrier properties to fluorocarbon gases. Such a gas barrier rubber laminate is prepared by modifying a surface of a nylon film with low-temperature plasma treatment or corona discharge treatment, applying an organosilane solution to the modified surface, curing the organosilane, laying a rubber layer on the cured organosilane, and curing the rubber layer thereto.

4 Claims, 1 Drawing Sheet

GAS BARRIER RUBBER LAMINATE FOR MINIMIZING REFRIGERANT LEAKAGE

This is a Continuation of application Ser. No. 08/168,139 filed Dec. 17, 1993, now abandoned.

BACKGROUND OF THE INVENTION

1. Field of the Invention

This invention relates to a rubber laminate having improved barrier properties to fluorocarbon and other gases and improved flexibility, and more particularly, to a gas barrier rubber laminate suitable for forming rubber hoses and air springs for use in air conditioners using fluorocarbon gas refrigerant.

2. Prior Art

Rubber hoses are widely used in automobile fuel systems, torque converters, power steering systems, air conditioners, refrigerators, and propane gas supplies as well as ordinary household uses. The rubber hoses are intended to pass a variety of media such as water, oil, organic solvents and gases and in all cases, required to be fully resistant to the media. Especially high pressure hoses for use as refrigerant tubes in building and automotive air conditioners are desired to exhibit improved impermeability to fluorocarbon and other refrigerant gases while remaining fully flexible.

However, the gas filled in the refrigerant tubes gradually penetrates and escapes through the wall of the rubber hose. It was thus necessary in the case of automotive air conditioners, for example, to re-charge the system with refrigerant every 4 or 5 years.

To improve the gas impermeability of rubber hoses, there were proposed a number of methods including (1) to increase the amount and wall thickness of rubber used, (2) to coat the rubber hose inner surface with nylon film (see Japanese Patent Application Kokai (JP-A) 123661/1984 and 113885/1985), and (3) to cover a nylon inner tube with rubber to form a hose (see JP-A 113882/1985). Beside from the rubber hoses, it is known that plastic films are improved in gas impermeability by (4) using a coating of organosilane as a gas barrier film (JP-A 112635/1987 and 286331/1990). However, method (1) has the problem that increased gage leads to an increase of product weight, an increased cost and a loss of flexibility. Impermeability to gases is improved to a limited extent. Methods (2) and (3) are insufficient in gas impermeability. Especially method (2) is difficult to continuously manufacture rubber hoses and a conventional combination of rubber with nylon or the like cannot fully satisfy the properties required for rubber hoses such as refrigerant tubes. Method (4) has the difficulty in using an organosilane coating as a gas barrier film in applications where significant deformation occurs.

SUMMARY OF THE INVENTION

Therefore, an object of the present invention is to provide a novel and improved rubber laminate having improved barrier properties to fluorocarbon and other gases and sufficient flexibility to form rubber hoses and air springs. Another object of the present invention is to provide a method for preparing the gas barrier rubber laminate.

The inventors have found that when a plastic film layer of nylon resin is formed inside a rubber layer and an intermediate layer of a cured product of an organosilane of formula (1) defined below is interposed between the plastic film layer and the rubber layer, there is obtained a rubber laminate having barrier properties to fluorocarbon (Freon) and other gases without a loss of pliability and flexibility as a hose. This is especially true when the plastic film is previously surface modified by low-temperature plasma treatment or corona discharge treatment because the surface modification of the plastic film improves the adhesive force between the plastic film and the intermediate layer.

More particularly, in the manufacture of a rubber hose for conducting fluorocarbon gas refrigerant therethrough, it is advantageous to use a plastic film of nylon resin as a rubber hose inner tube because the nylon resin film is fully flexible and heat resistant. For example, a nylon resin film of 100 μm gage had a gas transmission rate of 3 to 300 ml[STP]/m²·24 h·atm. as measured by the apparatus prescribed in JIS Z-1701 or ASTM D-1434 in a constant temperature tank at 100° C. These values indicate much potential gas leakage for the application as refrigerant tubes in air conditioners intended for long-term service. If an intermediate layer of a cured product of an organosilane of formula (1) defined below is interposed between the nylon resin film and the rubber layer, then the gas transmission rate through the laminate is substantially reduced. The composite rubber hose of such construction maintains flexibility, pliability and heat resistance required for rubber hoses. Then this rubber hose, when used as a refrigerant tube in air conditioners, for example, is effective for minimizing leakage of refrigerant gas. The present invention is predicated on this finding.

According to the present invention, there is provided a gas barrier rubber laminate comprising a plastic film layer, a rubber layer, and an intermediate gas barrier layer therebetween composed of a cured product of an organosilane of the following formula (1).

In formula (1), each of $R^1$ and $R^2$ is a saturated or unsaturated hydrocarbon radical or alkoxy radical, and each of $R^3$ and $R^4$ is a saturated or unsaturated hydrocarbon radical.

In another aspect, the invention provides a method for preparing a gas barrier rubber laminate comprising the steps of: modifying a surface of a plastic film with low-temperature plasma treatment or corona discharge treatment, applying to the modified surface a solution of an organosilane of formula (1), curing the organosilane, preferably by exposure to ultraviolet radiation, and placing a rubber layer on the cured organosilane for integrating the rubber layer thereto.

BRIEF DESCRIPTION OF THE DRAWING

The only figure.

DETAILED DESCRIPTION OF THE INVENTION

Figure 1:
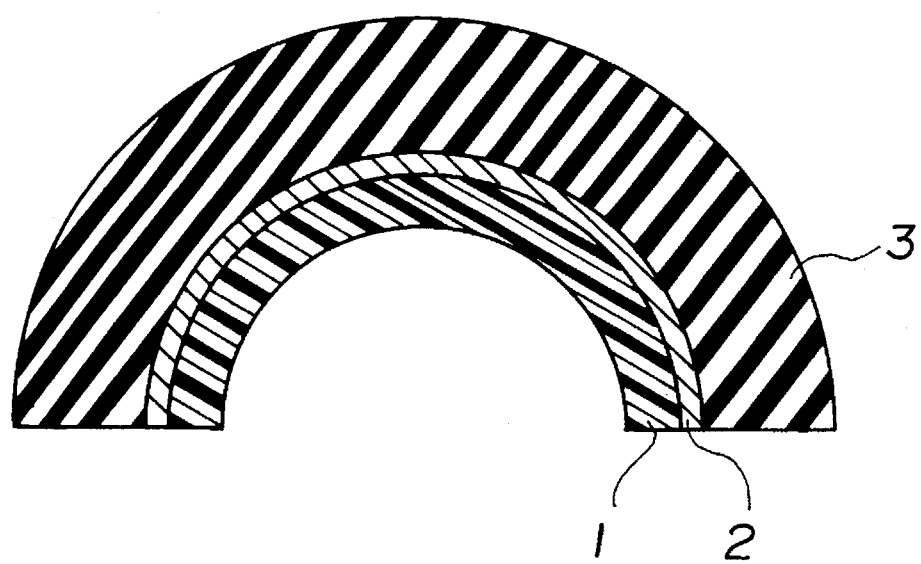
FIG. 1 is a cross sectional view of an upper half of a rubber hose according to one embodiment of the invention.

The gas barrier rubber laminate of the present invention includes an innermost layer in the form of a plastic film, an intermediate layer in the form of a cured product of organosilane, and an outer layer in the form of a rubber layer. In most cases, the laminate is shaped as a low permeable rubber hose as shown in FIG. 1. The hose is fabricated by forming an intermediate layer 2 on the outer surface of a plastic film layer 1 from a cured product of organosilane, and placing a rubber layer 3 over the intermediate layer 2.

The plastic film layer is formed of resinous materials, for example, polyamide resins such as nylon 6, nylon 66, nylon 11, nylon 12, copolymers thereof and blends thereof with olefins, olefin resins such as polyethylene and polypropylene, polyester resins such as polyethylene terephthalate, polyurethane resins, and vinyl alcohol resins such as polyvinyl butyral and ethylene-vinyl alcohol copolymers. Preferred are polyamide resins from the standpoints of flexibility, heat resistance, and solvent resistance.

No particular limit is imposed on the thickness of the plastic film layer although it is preferably 1 to 500 μm, especially 10 to 200 μm thick. Plastic film layer of thinner than 1 μm would be rupturable and thus difficult to produce and handle whereas flexibility is somewhat lost at a thickness in excess of 500 μm.

The intermediate layer is formed of a cured product of an organosiloxane of formula (1).

Each of $R^1$ and $R^2$ is a saturated or unsaturated hydrocarbon radical or alkoxy radical. Exemplary alkoxy radicals are methoxy and ethoxy radicals. Preferred saturated or unsaturated hydrocarbon radicals are those having 1 to 20 carbon atoms. Exemplary saturated hydrocarbon radicals include alkyl radicals such as methyl, ethyl and propyl radicals, aminoalkyl radicals, mercaptoalkyl radicals, and halogenated alkyl radicals. Exemplary unsaturated hydrocarbon radicals include vinyl, vinylalkyl, and methacryloxyalkyl radicals.

Each of $R^3$ and $R^4$ is a saturated or unsaturated hydrocarbon radical, preferably having 1 to 3 carbon atoms. Exemplary hydrocarbon radicals are as described for $R^1$ and $R^2$, with the lower alkyl radicals such as methyl and ethyl being preferred. That is, $—OR^3$ and $—OR^4$ are preferably alkoxy radicals such as methoxy and ethoxy radicals.

Included in the organosilanes of formula (1) are tetraalkoxysilanes wherein both $R^1$ and $R^2$ are alkoxy radicals, trialkoxysilanes wherein either one of $R^1$ and $R^2$ is an alkoxy radical, and dialkoxysilanes wherein neither $R^1$ or $R^2$ is an alkoxy radical, with the proviso that both $R^3$ and $R^4$ are alkyl radicals in all cases. However, there is a likelihood that if the organosilane consists solely of a tetraalkoxysilane(s), a cured product thereof be less flexible, and if the organosilane consists solely of a dialkoxysilane(s), a cured product thereof be less impermeable to gases. Then use of trialkoxysilane is most preferred. To obtain a cured product having necessary physical properties, trialkoxysilane may be blended with a proper amount of dialkoxysilane.

It will be understood that the intermediate layer may consist of a single lamina or two or more distinct laminae. For practical use, it is preferred to increase the adhesive forces of the intermediate layer to the plastic film layer and the rubber layer by using an intermediate layer of two distinct laminae each adapted for adhesion to the corresponding layer. This is effective particularly when the rubber layer is formed of rubbers which are generally alleged to be less bondable, for example, butyl rubber and EPDM rubber.

No particular limit is imposed on the thickness of the intermediate layer although it is preferably 0.1 to 100 μm, especially 0.5 to 50 μm thick. Layers of thinner than 0.1 μm would be less effective for reducing gas transmission whereas layers having a thickness in excess of 100 μm would be difficult to coat uniformly and can detract from the flexibility of the rubber laminate or hose.

Formed outside the intermediate layer is a rubber layer. It may be formed of any desired rubber material, for example, natural rubber, butadiene rubber (BR), styrene-butadiene copolymer rubber (SBR), chloroprene rubber (CR), acrylonitrile-butadiene rubber (NBR), isobutylene-isoprene rubber (IIR), ethylene-propylenediene rubber (EPDM), and silicone rubber, as well as blends and laminates thereof.

To the rubber material there may be added commonly used additives, for example, reinforcing agents (e.g., carbon), vulcanizing accelerators (e.g., stearic acid), antioxidants and crosslinking agents. The rubber layer may be provided with a reinforcement of polyester fibers or the like.

The thickness of the rubber layer may be determined in accordance with an intended use and purpose and is preferably 2 to 30 mm, especially 3 to 20 mm for the rubber hose application.

The method for preparing a rubber laminate as defined above is not particularly limited. For example, a low permeable rubber hose as shown in FIG. 1 is prepared by first modifying the outer surface of an inner tube or plastic film layer 1. A modification uses low-temperature plasma treatment or corona discharge treatment, with the plasma treatment being preferred. For the low-temperature plasma treatment, reference may be made to H.V. Boening, Fundamentals of Plasma Chemistry and Technology, Technomic Publishing.

Preferred conditions for low-temperature plasma treatment include a pressure of at least 1 mTorr, especially 10 to 1,000 mTorr, a frequency of 100 kHz to 10 GHz, especially 200 kHz to 100 MHz, a power of 0.01 to 100 W/cm$^2$, especially 0.05 to 5 W/cm$^2$, and a plasma exposure time of 1 second to 10 minutes, especially 3 seconds to 5 minutes. The preferred atmospheric gas includes argon, oxygen, nitrogen, air, helium, and carbon tetrafluoride.

In the case of corona electric discharge, either DC or AC discharge may be used. AC discharge can be generated at any desired frequency up to the high frequency, preferably 1 kHz to 500 kHz and a power of at least 0.5 W/cm$^2$, preferably 5 to 500 W/cm$^2$ while the treating rate may range from 0.05 to 100 m/min., preferably from 0.1 to 5 m/min. Corona discharge treatment in air under atmospheric pressure is preferred in practice though the invention is not limited thereto.

Formed on the modified surface of the plastic film layer 1 is the intermediate layer 2 of organosilane. The organosilane used herein preferably has an alkoxy radical hydrolyzed. For hydrolysis of an alkoxy radical, the organosilane may be dissolved in water. Alternatively a small amount of water may be added to an alcohol solution of the organosilane followed by thorough agitation. Acetic acid and other pH adjusting agents may be added, if desired.

The intermediate layer is formed on the plastic film layer by coating a hydrolyzed organosilane aqueous or alcoholic solution or an organosilane stock solution to a nylon resin film to a predetermined thickness, evaporating the solvent when the aqueous or alcoholic solution is used, drying the organosilane coating, and thereafter curing the organosilane coating. Curing can be effected by irradiating ultraviolet (UV) radiation, irradiating electron or gamma-radiation, heating, or contacting with a low-temperature plasma atmosphere, with the UV exposure being most preferred. It will be understood that heat curing can be later accomplished at the same time as the vulcanization curing of rubber to be laid on the intermediate layer.

The rubber layer is formed on and integrated with the intermediate layer by any conventional technique. In one exemplary procedure, an unvulcanized rubber compound having selected ingredients blended is applied to the intermediate layer directly or to a vulcanization adhesive thinly coated over the intermediate layer, as by wrapping, to a predetermined thickness. The rubber at the outside is covered with a metal or resin sheath and heated at high temperature for a time until vulcanization is complete. The metal or resin sheath is finally removed.

EXAMPLE

Examples of the present invention are given below by way of illustration and not way of limitation.

EXAMPLES 1–2 & COMPARATIVE EXAMPLE 1

Using copolymerized nylon 6/66 (Nylon 5033 commercially available from Ube Kosan K.K.), a film of 100 μm gage was prepared by T-die extrusion. The nylon film was subjected to RF plasma discharge treatment for 2 minutes in an argon gas at a pressure of 1 Torr and a frequency of 13.56 MHz.

Separately, an organosilane solution was prepared by mixing 20 grams of N-(β-aminoethyl)-γ-aminopropyltrimethoxysilane (TSL 8340 commercially available from Toshiba Silicone K.K.), 80 grams of methanol and 1 gram of pure water, thoroughly agitating the mixture, and allowing the mixture to stand over two days.

An unvulcanized NBR composition was formulated by mixing 100 parts of NBR, 5 parts of zinc oxide, 1.5 parts of sulfur, 1 part of stearic acid, 1 part of a vulcanizing accelerator, and 40 parts of carbon black, all parts being by weight.

The organosilane solution was cast onto the nylon film and dried with hot air at 60° C. A sheet of the unvulcanized NBR composition having a gage of 1 mm was laid on the coated nylon film and vulcanized at 150° C. for 20 minutes in a heat press. There was obtained a film laminate A (Example 1).

A film laminate B (Example 2) was fabricated by casting an alcohol solution of vinylbenzylaminosilane (SZ 6032 commercially available from Toray Dow Corning K.K.) onto the same nylon film as used in Example 1 to a suitable thickness, exposing the coated nylon film to UV radiation under a mercury lamp (manufactured by Matsumoto Electric K.K.) for curing the coating to a dry thickness of 5 μm, brush coating the same alcohol solution of vinylbenzylaminosilane as above to the coating again, but very thinly, laying a sheet of the same NBR composition as above thereon, and vulcanizing the rubber for integration, all under substantially the same conditions as in Example 1.

A film laminate C (Comparative Example 1) was fabricated by coating the same nylon film as in Example 1 with a urethane adhesive (Desmodur R commercially available from Bayer A.G.), layer a NBR sheet of 1 mm gage thereon, and vulcanizing at 150° C. for 20 minutes in a heat press.

Strip samples of 1 inch wide were cut from film laminates A, B and C and examined for adhesion between the plastic film layer and the rubber layer by a 180° peeling test using an autograph (manufactured by Shimazu Rika K.K.). All film laminates A, B and C showed excellent adhesion as evidenced by 100% failure with in the rubber layer.

Film laminates A, B and C were measured for gas transmission rate. Using a gas transmission rate measuring system model GTR-30XB (manufactured by Yanako Analysis Industry K.K.), a transmission rate of Freon R-22 gas at 100° C. was determined. The transmission rate was calculated according to JIS Z-1707 except that the measuring temperature was 100° C. The results are shown in Table 1.

TABLE 1

| | Gas transmission rate (ml/m² · 24 h · atm) |
|---|---|
| A, Example 1 | 800 |
| B, Example 2 | 260 |
| C, Comparative Example 1 | 3200 |

The rubber laminate of the invention is fully flexible and pliable and has improved gas barrier properties to fluorocarbon gases. The method of the invention ensures easy manufacture of such a rubber laminate.

We claim:

1. A gas barrier rubber laminate for minimizing leakage of fluorocarbon gas refrigerant comprising; a film layer of a polyamide or a blend of polyamide with a polyolefin, a layer of rubber selected from the group consisting of natural rubber, butadiene rubber, styrene-butadiene copolymer rubber, chloroprene rubber, acrylonitrile-butadiene rubber and isobutylene-isoprene rubber, and an intermediate gas barrier layer therebetween composed of a cured product of an organosilane of the formula (1):

wherein each of $R^1$ and $R^2$ is a saturated or unsaturated hydrocarbon radical or alkoxy radical, and each of $R^3$ and $R^4$ is a saturated or unsaturated hydrocarbon radical.

2. A fluorocarbon gas rubber laminate as in claim 1 wherein said film layer has a thickness in the range of 1 to 500 μm.

3. A fluorocarbon gas barrier rubber laminate for minimizing leakage of fluorocarbon gas refrigerant comprising; a film layer of a polyamide or blend of polyamide with a polyolefin, a layer of rubber selected from the group consisting of natural rubber, butadiene rubber, styrene-butadiene copolymer rubber, chloroprene rubber, acrylonitrile-butadiene rubber and isobutylene-isoprene rubber, and an intermediate gas barrier layer therebetween, the surface of the film layer to which the intermediate gas barrier layer is formed is surface modified by low-temperature plasma treatment or corona discharge treatment, and the intermediate gas barrier layer is composed of a cured product of an organosilane of the formula (1):

wherein each of $R^1$ and $R^2$ is a saturated or unsaturated hydrocarbon radical or alkoxy radical, and each of $R^3$ and $R^4$ is a saturated or unsaturated hydrocarbon radical.

4. A fluorocarbon gas rubber laminate as in claim 3 wherein said film layer has a thickness in the range of 1 to 500 μm.

* * * * *